INVENTORS
WALTER V. MARBACH
FRANK J. ACTON
HARRY P. EICHIN
LOUIS L. WINOKUR
BY
ATTORNEY

United States Patent Office 3,809,576
Patented May 7, 1974

3,809,576
METHOD AND APPARATUS FOR MOISTURIZING SHIRRED CASING STICKS
Walter V. Marbach, Palos Heights, Frank J. Acton, Glen Ellyn, Harry P. Eichin, Western Springs, and Louis L. Winokur, Evanston, Ill., assignors to Union Carbide Corporation
Continuation of abandoned application Ser. No. 637,538, Mar. 10, 1967. This application Oct. 22, 1970, Ser. No. 83,219
Int. Cl. A22c 13/00
U.S. Cl. 134—42
6 Claims

ABSTRACT OF THE DISCLOSURE

Shirred casing sticks are moisturized after being shirred but prior to being packaged into cartons for subsequent shipment. Apparatus and method are provided for moisturizing shirred casing sticks which comprises, in combination, at least one deformable member capable of absorbing and retaining water and releasing water upon being deformed; means for wetting said deformable member with water; means for maintaining said deformable member wetted with water such that at least a portion of the circumferential surface of a shirred casing stick extending along its longitudinal axis can be placed in frictional engagement with said deformable member and moisturized thereby; and means for removing a moisturized shirred casing stick from the apparatus.

---

This application is a continuation of application Ser. No. 637,538, filed Mar. 10, 1967, and now abandoned.

This invention relates to moisturizing shirred casing sticks with water. More particularly, this invention relates to moisturizing shirred casing sticks with water after they have been shirred but before they have been packaged into cartons.

Casings, such as cellulose sausage casings, are conventionally fabricated in continuous, tubular lengths and are, thereafter, shirred, compacted and compressed, by various means well known to those skilled in the art, to obtain relatively rigid, shirred casing sticks. Normally, these lengths of shirred casing sticks are made to substantially correspond to the lengths of commercial stuffing tubes which are utilized to stuff food emulsions therein. A typical method of shirring tubular lengths of casing is described in U.S. Pat. 2,984,574 to Matecki.

According to present practices a continuous, tubular length of cellulose casing, measuring from between about 40 to 80 feet and longer, is typically shirred; that is, has pleats defined about its circumference along its length, then compacted; that is, the pleats are loosely gathered, and finally compressed to obtain a rigid, tubular, casing stick of between about 6 to 14 inches in length. More recently, continuous lengths of tubular casings measuring about 160 feet or more have been shirred, compacted and compressed to obtain rigid tubular casing sticks having compressed lengths of from between about 20–22 inches. In addition, the use of automatic stuffing apparatus has necessitated innovations wherein one end of shirred casing sticks are required to be closed before being packaged into cartons, commonly referred to in the art as caddies, in preparation for subsequent shipment to food packagers who normally stuff them with food emulsions. When ready for use, these shirred casing sticks are removed from the caddies and are fed through automatic hopper feeder means so that the open end of each shirred casing stick is automatically properly positioned on a stuffing tube.

During the shirring operation, the moisture content of tubular casings is generally maintained at a level of from between about 6% to 12% so that a proper shirring pattern and pleats can be obtained therein. At this moisture level, the shirred casing stick is rigid, relatively brittle and readily susceptible to puncture or breakage. When shirred casing sticks are at this moisture level and positioned on a stuffing tube and subsequently stuffed with a food emulsion, a substantial amount of casing breakage results and significant product waste and shutdown time occurs. Hence, prior to use, shirred casing sticks are further humidified; that is, their moisture content is increased, in order to render them more pliable and enhance their workability. In order to assure that the thusly moistened shirred casing sticks have attained the degree of pliancy desired for stuffing, the moistened shirred casing sticks are permitted to stand for a period of about 7 days so that they can equilibrate; that is, attain a uniform moisture content throughout their compressed length. Generally, a properly moistened shirred casing stick will be in an acceptable condition for stuffing with a food emulsion when it has attained a substantially uniform moisture content of from between about 14% to 20%.

Under present methods, it is the general practice to package lengths of shirred casing sticks into caddies before humidifying them; that is, subjecting them to further moisture treatment. Generally, this moisture treatment is accomplished with humidified air to assure that each part of all the shirred casing sticks become moistened. After this additional moisture treatment, the caddies are prepared for shipment and the thusly moistened shirred casing sticks are permitted to equilibrate prior to use. Typical of the method and means currently practiced and utilized to further humidify shirred casing sticks are those illustrated and disclosed in U.S. Pats. 2,181,329; 3,028,952; 3,148,992 and 3,250,629.

It is an object of the present invention, therefore, to provide a method and apparatus for moistening shirred casing sticks after the tubular lengths of casing have been shirred and before the thusly moistened shirred casing sticks are packaged for shipment.

This and further objects of the present invention will become more apparent from the following description thereof.

It has now been found that the objects of the present invention can be generally attained by providing an apparatus comprising, in combination, means for contacting at least a portion of the circumferential length of a shirred casing stick with the surface of at least one deformable, water absorbable-water releasable member; means for applying pressure to said water absorbable-water releasable member so that at least a portion of the circumferential surface of the thusly contacted shirred food casing stick is wetted and moistened; means for replenishing and maintaining the water content of said deformable, water absorbable-water releasable member at a predetermined level; and, means for removing the thusly wetted and moistened shirred casing stick from the apparatus.

The apparatus of the present invention also includes means for rotating a shirred casing stick about its longitudinal axis while in contact with a deformable, water absorbable-water releasable member to wet and moisten the circumferential surface of said shirred casing stick during rotation thereof.

As used throughout this application and in the appended claims, the term "water" is intended to refer to and should be understood as defining that physical state of water wherein it is liquid as opposed to being in a vapor or solid state.

Although the present invention is directed to moisturizing a shirred casing stick primarily with water, it should be understood that other ingredients and additives can be utilized in place of or mixed with the water and applied to the shirred casing sticks by the means and methods described herein. Exemplary of such ingredients and additives are those which improve the peelability characteristic of the casing, enhance the ability of the shirred casing stick to be wetted, promote color and skin formation of meat emulsion encased in the casings, as well as antibacterial agents, deodorants, lubricants, stabilizers, plasticizers, and the like.

The manner in which the objects of the present invention can be accomplished will be more clearly understood when considered together with the accompanying drawing, which is set forth as being illustrative thereof and is not intended, in any way, to be limitative thereof, and wherein.

Figure 1:
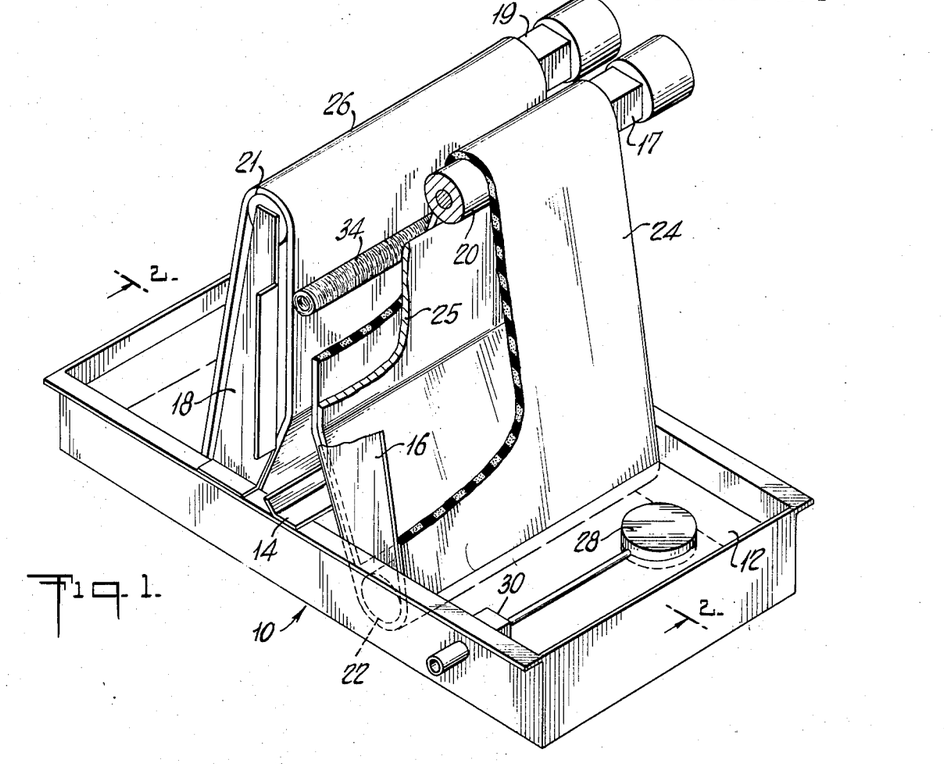
FIG. 1 is a perspective view, part in section and part broken away, of one embodiment of the apparatus of the present invention.
Figure 2:
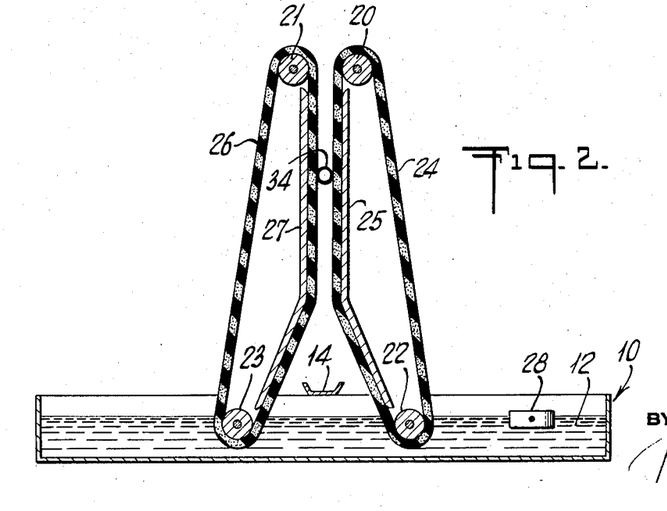
FIG. 2 is a sectional view thereof taken through line 2—2 of FIG. 1.

Turning now to the drawing, wherein like reference numerals denote like parts, there is shown in FIGS. 1 and 2 a tank, generally indicated by reference numeral 10 which is filled with water 12. Mounted to the sides of and disposed across the width intermediate the ends of tank 10 is a receiving trough 14 fabricated in a form suitable for accepting a moistened and wetted shirring casing stick therein. A pair of brackets 16 and 18 are also mounted to the sides of tank 10 and are positioned adjacent one end and on each side of receiving trough 14. Bracket 16 is movably mounted to tank 10 by conventional means (not shown) while bracket 18 is fixedly mounted to tank 10.

On the other side of tank 10 conventional gear boxes 17 and 19 are supported by conventional means (not shown). Gear boxes 17 and 19 can be connected to a suitable source of energy, such as a conventional electric motor, to be energized. Gear box 17 is movably mounted so that it can be adjusted to the same extent as movable bracket 16 when it is moved, while gear box 19 is fixedly mounted.

A pair of horizontally disposed, top driven rolls 20 and 21 are rotatably mounted between brackets 16 and 18 and gear boxes 17 and 19, respectively, so that they are also substantially parallel to each other. Top driven roll 20 is actuated by gear box 17 to rotate in a counterclockwise direction while top driven roll 21 is actuated by gear box 19 to rotate in a clockwise direction.

In similar fashion, a pair of bottom idler rolls 22 and 23 (FIG. 2) are also horizontally and parallelly disposed to extend across the width of tank 10. Bottom idler rolls 22, 23 are positioned beneath top driven rolls 20 and 21, respectively, and are rotatably mounted at their extremities to the side walls of tank 10 by conventional means (not shown). Additionally, bottom idler rolls 22, 23 are positioned in tank 10 so that they are at least partially submerged when tank 10 is filled with water 12.

Trained about bottom idler roll 22 and top driven roll 20 is a deformable, water absorbable-water releasable member 24 fabricated in the form of an endless belt. Deformable belt member 24 should be of a width sufficient to extend substantially across the length of top driven roll 20 and bottom idler roll 22. A second deformable, water absorbable-water releasable member 26 is similarly fabricated in the form of an endless belt and is trained about and also extended across the length of top driven roll 21 and bottom idler roll 23. In this manner, the planar surfaces of deformable belt members 24 and 26 are disposed opposite and substantially parallel to each other. The distance between the opposed, planar surfaces of deformable belt members 24 and 26 can be varied by adjusting movably mounted bracket 16 and gear box 17 to permit shirred casing sticks having different diameters to be admitted therebetween.

The material selected for use as the deformable, water absorbable-water releasable members of the present invention is not critical. These members can be readily fabricated in the form of endless belts utilizing any material that is reticulated, foamed or spongy, capable of absorbing and retaining water and capable of releasing the water upon deformation. Typical of the materials which can be employed for the deformable, water absorbable-water releasable members are those obtained from such materials as vinyl, rubber, polyurethane, regenerated cellulose, viscose, and the like. In a preferred embodiment of the present invention, the deformable, water absorbable-water releasable members are obtained and fabricated from a reticulated, polyurethane foam, such as that disclosed in U.S. Pat. 3,171,820, having a fully porous, sponge-like structure.

Further reference to the term "deformable member" throughout this application and in the appended claims, therefore, is intended to include, refer to and should be understood as being the same as and equivalent to those deformable, water absorbable-water releasable members having the properties set forth hereinabove of absorbing and retaining water and releasing water upon being deformed, regardless of the form in which they are fabricated.

A pair of backing plates 25 and 27 are also mounted to the sides of tank 10 adjacent brackets 16 and 18. Backing plates 25 and 27 are positioned behind the opposed planar surfaces of deformable belt members 24 and 26, respectively, in order to impart some degree of rigidity thereto. Backing plate 27 is fixedly mounted while backing plate 25 is movably mounted similar to bracket 16 so that it will remain in its position relative to deformable belt member 24 when movable bracket 16 and gear box 17 are adjusted to compensate for different diameters of shirred casing sticks.

The level of water 12 in tank 10 can be kept constant in a manner well known to those skilled in the art by the use of such means as a float 28 connected to a valve 30. Valve 30 can be conventionally mounted to a side wall of tank 10 and can be connected to a supply source of water (not shown).

Figure 3:
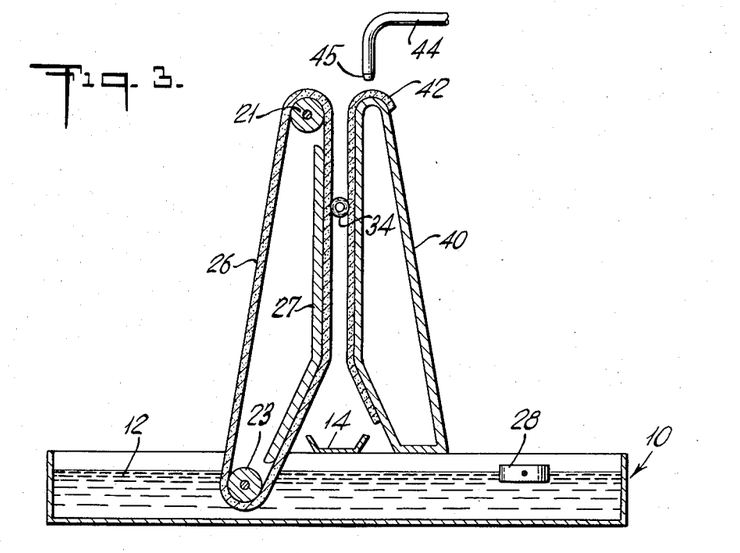
FIG. 3 is an end elevational view, part in section, of an alternate embodiment of the apparatus of FIG. 1.

In the alternate embodiment of the apparatus of FIG. 1 as illustrated in FIG. 3, there is shown a support plate 40 which is secured to the side walls of tank 10 and which is fabricated to extend across the width of tank 10. Secured to one planar surface of support plate 40 is a deformable member 42 fabricated in the form of a pad having a length and width sufficient to substantially cover the planar surface of support plate 40 to which it is secured. Deformable pad member 42 is secured to support plate 40 so that its planar surface is disposed substantially parallel to and opposite the planar surface of deformable belt member 26 in a manner similar to that described in the apparatus depicted in FIGS. 1 and 2 above for deformable belt member 24.

Deformable pad member 42 is wetted and constantly replenished with water by means of conduit 44 connected to a suitable supply source of water (not shown) and is equipped with a spray nozzle 45.

In the embodiment shown in FIG. 3, either support plate 40 and/or backing plate 27 can be pivotably mounted to tank 10 so that the distance between the planar surfaces of deformable belt member 26 and deformable pad member 42 can be readily adjusted to permit shirred casing sticks of varying diameters to be admitted therebetween.

Figure 4:
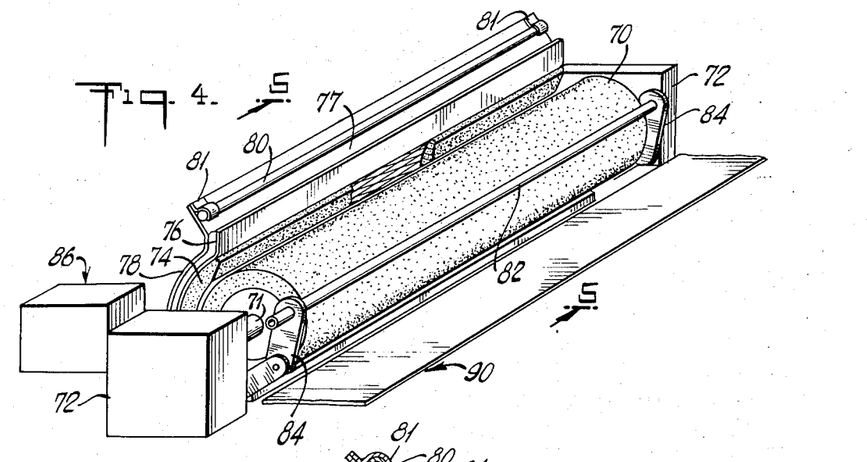
FIG. 4 is a perspective view, part in section and part broken away, of another embodiment of the apparatus of the present invention.
Figure 5:
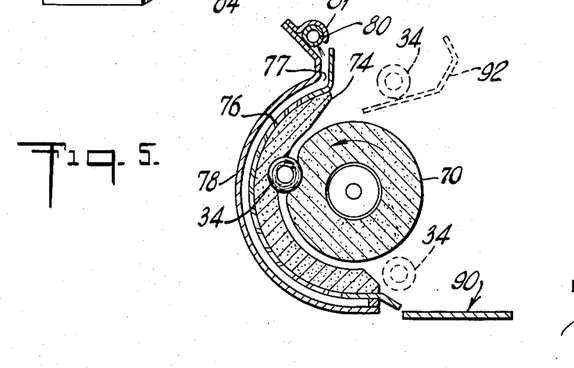
FIG. 5 is a view taken through line 5—5 of FIG. 4.

FIGS. 4 and 5 illustrate another embodiment of the apparatus of the present invention. As shown in FIG. 4, a deformable roll member 70 is rotatably mounted to and between a pair of support brackets 72 by means of its shaft 71. Positioned adjacent one side of and extending substantially the same length as deformable roll member 70 there is mounted an expanded metal backing 76 fabricated in the form of an arc which is substantially concentric to the circumference of deformable roll member 70 and which has a flanged upper end. Bonded to the arcuate surface of the metal backing 76 nearest deformable roll member 70 is a deformable pad member 74.

Ajacent the opposite arcuate surface of expanded metal backing 76 there is disposed a solid metal backing plate 78 having a flanged upper end and which is also fabricated in the form of an arc. Solid metal backing plate 78 is fabricated so that its arcuate surface is substantially concentric to the arcuate surface of expanded metal backing 76. Expanded metal backing 76 and solid metal backing plate 78 are joined to each other along their side and bottom edges to define and form a chamber 77 therebetween.

Expanded metal backing 76 and solid metal backing plate 78 are preferably movably mounted so that they can be adjusted to accommodate the passage of shirred casing sticks of varying diameter between the deformable pad member 74 and the circumferential surface of deformable roll member 70.

Water is supplied from a suitable supply source (not shown) to deformable pad member 74 by means of a water supply tube 80 which can be mounted to one of the flanged ends of either expanded metal backing 76 or solid metal backing plate 78 by means of conventional brackets 81. Water is admitted from water supply tube 80 into chamber 77 and is absorbed therefrom by deformable pad member 74 through expanded metal backing 76. In this manner, deformable pad member 74 is wetted. Water is also supplied from a suitable supply source (not shown) to deformable roll member 70 by means of a second water supply tube 82 which is positioned adjacent one circumferential side edge of deformable roll member 70 and opposite deformable pad member 74. Second water supply tube 82 can be rotated through an arc toward and away from the circumferential surface of deformable roll member 70 by means of a pair of connecting links 84 to which the ends of second water supply tube 82 are secured. Rotation of second water supply tube 82 by this means is provided in order that the disposition of second water supply tube 82 relative to deformable roll member 70 can be adjusted as desired or required.

A conventional drive means, such as an electric motor, generally designated by reference numeral 86, provides the means by which deformable roll member 70 is rotated in a counter-clockwise direction.

In FIGS. 4 and 5, reference numeral 90 generally denotes a conveyor belt which can be positioned adjacent the apparatus to receive a wetted, shirred casing stick as it leaves the apparatus while reference numeral 92 (FIG. 5) denotes a delivery and guide chute (shown in phantom) which can be utilized to receive a shirred casing stick as it is doffed from a shirring mandrel and then deliver and position the shirred casing stick in the apparatus.

Figures 6, 7:
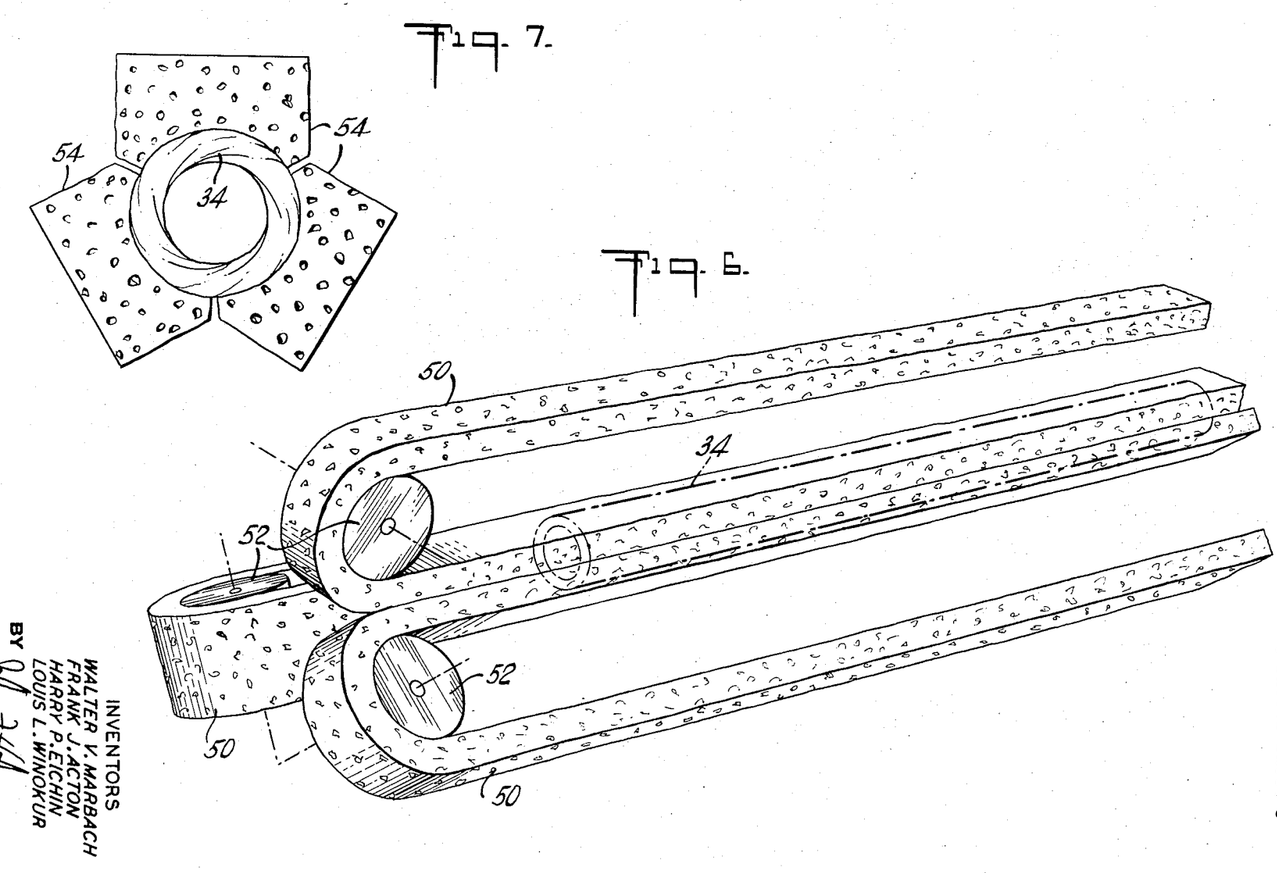
FIG. 6 is a perspective view, part in phantom and part broken away, of a further embodiment of the apparatus of the present invention.
FIG. 7 is an end elevational view of an alternate embodiment of the apparatus of FIG. 6.

Turning now to FIG. 6 is shown therein a plurality of deformable members fabricated in the form of endless belts 50 each of which is trained about its own pair of rolls 52. At least one of the rolls 52 is a driven roll energized by conventional drive means (not shown) so that all of the deformable belt members 50 are driven in the same direction.

In the preferred embodiment of the apparatus depicted in FIG. 6 three deformable belt members 50 are employed and are positioned relative to each other to receive and permit the passage therethrough and therebetween of a shirred casing stick 34 as it is doffed from the shirring mandrel of a shirring apparatus. The deformable belt members 50 illustrated in FIG. 6 are positioned relative to each other at twelve o'clock, four o'clock and eight o'clock.

In the alternate embodiment of the apparatus of FIG. 6 depicted in FIG. 7, the deformable belt members 50 are replaced by deformable pad members 54 positioned and aligned with respect to each other in the same manner as described for the deformable belt members 50 in FIG. 6.

The deformable pad members 54 shown in FIG. 7 can each be mounted to its own advance and retraction means (not shown) such as a pneumatic cylinder equipped with a piston rod. Alternately, one or more deformable pad members 54 can be fixedly mounted while the others are retractably mounted as described hereinabove.

Figure 8:
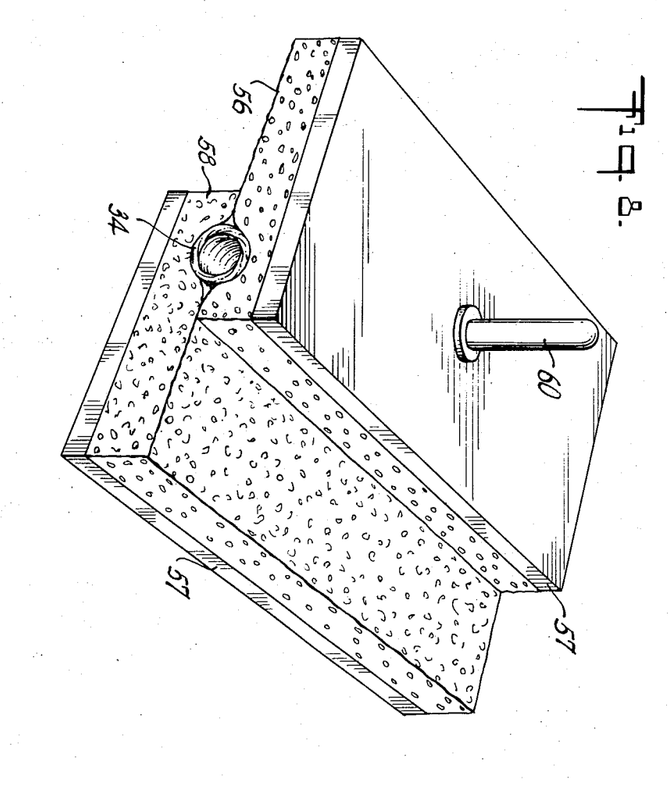
FIGS. 8 and 9 are perspective views illustrating still further embodiments of the apparatus of the present invention.

In FIG. 8, there is illustrated two deformable pad members, 56 and 58, each having a support plate 57 bonded thereto. The planar surfaces of pad members 56 and 58 are horizontally disposed opposite each other. Deformable pad members 56, 58 can be hand operated by fixedly securing one deformable pad member, such as 58, while the other deformable pad member 56 is provided with a handle 60 so that deformable pad member 56 can be horizontally displaced with respect to fixedly secured deformable pad member 58. Alternately, handle 60 can be replaced with suitable connecting means and deformable pad member 56 can be automatically, horizontally displaced with respect to deformable pad member 58 by conventional reciprocating means, such as a pneumatic cylinder and piston rod.

Figure 9:
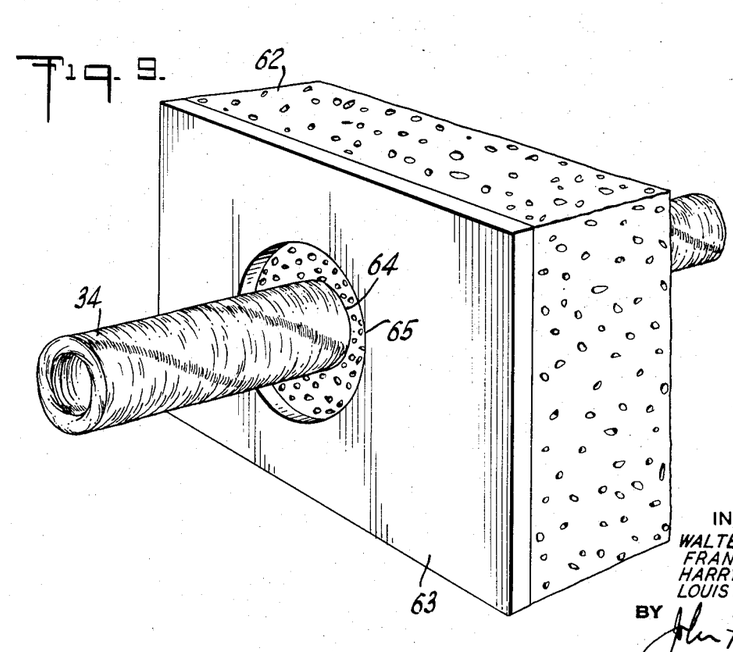

A still further embodiment of the present invention is illustrated in FIG. 9 wherein there is shown a deformable pad member 62 having a support plate 63 bonded to one side thereof.

Deformable pad member 62 and support member 63 each have an aperture 64 and 65, respectively, defined in and through the walls thereof which apertures are substantially concentric to each other and are of a size sufficient to permit the passage therethrough of a shirred casing stick 34 so that the circumferential surface of the shirred casing stick is frictionally engaged by the surface defining the aperture 64 formed in and through the wall of the deformable pad member 62.

The various embodiments of the apparatus of the present invention can be positioned at any point relative to the shirring mandrel of a shirring apparatus such as at either the doffing end of the shirring mandrel or adjacent to and coextensive with at least a portion of the doffing end of the shirring mandrel. When placed at the doffing end of a shirring mandrel, the apparatus can be positioned to receive a shirred casing stick as it is doffed from the shirring mandrel. When placed adjacent to and coextensive with at least a portion of the doffing end of a shirring mandrel, the apparatus can be positioned to wet and moisturize a shirred casing stick after it has been shirred but prior to the time it is completely doffed from the shirring mandrel. It should be understood, however, that positioning of the various embodiments of the apparatus of the present invention relative to the shirring mandrel of a shirring apparatus is not critical. The apparatus can be placed or positioned in any convenient location depending upon operating conditions and facilities or as desired or required.

A typical operation of the various embodiments of the present invention will now be described and will be more readily understood when considered together with the various figures of the drawing.

Turning first to FIGS. 1 and 2 of the drawing, the embodiment of the apparatus shown therein can first be positioned adjacent the shirring mandrel of a conventional shirring apparatus so that a shirred casing stick 34, when doffed from the shirring mandrel of the shirring apparatus, can be readily accepted by and positioned between deformable belt members 24 and 26.

Prior to start up of the shirring apparatus, tank 10 is filled with water through valve 30 until the desired level has been reached as determined by float 28. Next, the distance between the planar surfaces of deformable belt members 24, 26 is adjusted by means of movably mounted bracket 16 and movable gear box 17 in order to accommodate the diameter of the shirred casing stick that is to be moistened and wetted in the apparatus. Top driven rolls 20 and 21 are now actuated through the energization of gear boxes 17 and 19 and deformable belt members 24, 26 are permitted to become wetted by running through the water 12 in tank 10. Generally, deformable belt members 24, 26 will be sufficiently wet after being permitted to run through the water 12 in tank 10 for a period of from between about 3 to 5 minutes.

In adjusting the distance between the planar surfaces of deformable belt members 24, 26, it is only necessary that they be spaced apart a distance sufficient to permit a shirred casing stick 34 positioned therebetween to be frictionally engaged by the planar surfaces of the deformable belt members 24, 26, so that at least a portion of the circumferential surface of the shirred casing stick 34 extending along its longitudinal axis will be in contact with the planar surfaces of the deformable belt members 24, 26. For example, if a shirred casing stick having a diameter of about ¾ inch is to be moistened and wetted by the apparatus illustrated in FIGS. 1 and 2, the distance between the planar surfaces of deformable belt members 24, 26 should be adjusted to be from between about ½ to ⅝ of an inch.

As pointed out hereinabove, driven roll 20 is caused to rotate in a counter-clockwise direction thereby causing deformable belt member 24 to also move in a counter-clockwise direction while driven roll 21 is caused to rotate in a clockwise direction causing deformable belt member 26 to also move in a clockwise direction. The apparatus is now ready to receive shirred casing sticks from the shirring mandrel of a shirring apparatus.

Since the shirred casing stick 34 is frictionally engaged between the planar surfaces of deformable belt members 24, 26 and since both of the deformable belt members 24, 26 are caused to move in a direction toward the receiving trough 14, the shirred casing stick 34 is transported thereby and therebetween and conveyed to the receiving trough 14. However, it should be noted that to accomplish this, the direction of travel of the deformable belt members need not be the same. They can also be caused to travel in opposite directions provided the deformable belt member travelling toward the receiving trough 14 is always caused to travel at faster linear rate of speed than the other deformable belt member.

Where the open end, or sheathing end, of the shirred casing stick 34 has not previously been treated, it is preferred that the shirred casing stick 34 be positioned in the apparatus so that its open end extends beyond the side edges of deformable belt members 24, 26 as the shirred casing stick 34 is conveyed therebetween. This will prevent the open end of the shirred casing stick from becoming wetted and thereby avoid any subsequent difficulties created by the decompacting or deshirring of the open end of the shirred casing sticks during the time they are permitted to equilibrate. In a preferred embodiment of the present invention, therefore, shirred casing sticks being conveyed between deformable belt members 24, 26 are positioned therebetween so that their open ends extend beyond the side edges of deformable belt members 24, 26 a distance of from between about ¼ to ½ inch.

In order to assure that substantially the entire outer circumference of the shirred casing stick 34 being wetted between deformable belt members 24, 26 is, in fact, wetted, it is preferred that the shirred casing stick 34 be caused to revolve through at least ½ revolution from the time it is positioned between deformable belt members 24, 26 to the time it is deposited in receiving trough 14. This can be readily accomplished by causing one of the deformable belt members to move at a linear rate of speed slightly in excess of the other deformable belt member. As will be apparent to those skilled in the art, the shirred casing stick can be caused to revolve through more revolutions merely by adjusting the linear rate of speed of one deformable belt member relative to that of the other regardless of whether or not the deformable belt members are caused to rotate in the same or opposite directions. In this manner, the amount of moisture that the shirred casing stick picks up as it is conveyed between the planar surfaces of deformable belt members 24, 26 can be increased depending upon the number of revolutions the shirred casing stick is caused to make. However, the amount of moisture picked up by the casing stick has not been found to be strictly proportional to the number of revolutions made by the shirred casing stick. Each succeeding revolution made by the shirred casing stick has been found to pick up less moisture than the preceding revolution of the shirred casing stick. Hence, the total moisture which the shirred casing stick is capable of picking up is some exponential function of the number of revolutions which it is caused to make.

Time will also be a factor influencing the amount of moisture that a shirred casing stick will pick up as it is conveyed in the apparatus. The amount of time during which a shirred casing stick is permitted to be in contact with the planar surfaces of the deformable belt members of the apparatus can be varied either by regulating the linear speed of either one or both of the deformable belt members or by increasing the length of the deformable members.

A third factor in determining the amount of moisture a shirred casing stick will pick up is the distance established between the planar surfaces of the deformable belt members. It has been found that the minimum distance that can be adjusted between the planar surfaces of the deformable belt members is that wherein the planar surfaces are in tangential contact with each other. On the other hand, it has been found that the maximum distance between the planar surfaces of the deformable belt members that is permissible to obtain a sufficiently moistened and wetted shirred casing stick is when that distance is only slightly less than the diameter of the shirred casing stick to be conveyed therebetween; that is, the distance between the planar surfaces of deformable belt members is adjusted to only frictionally support a shirred food casing stick as it is conveyed therebetween. It has also been found that the amount of moisture that a shirred casing stick of a particular diameter is capable of picking up is directly proportional to the distance between the planar surfaces of the deformable belt members so that the greater the distance between the planar surfaces of the deformable belt members, the less will be the amount of moisture capable of being transferred to a shirred casing stick conveyed therebetween.

Another factor bearing on the amount of moisture picked up by and/or transferred to a shirred casing stick is the shirred density of the shirred casing stick. As is well known to those skilled in the art, shirred casing sticks exhibit difference in shirred density from one shirred casing stick to another as well as along the length of an individual shirred casing stick.

The shirred density differences along the length of a single shirred casing stick as well as between shirred casing sticks is believed to be influenced by and result from the method and apparatus utilized to shirr the tubular lengths of casing and also be somewhat dependent upon the length of tubular casing being shirred. For example, when longer lengths of tubular casing of about 160 feet or longer are shirred, they appear to exhibit a greater shirred density along their lengths than shirred casing sticks shirred from shorter lengths of tubular casing of about 80 feet. In the relatively denser shirred casing sticks, it has been observed that he compressed pleats are gathered more closely together thereby exposing less area between the pleats in which moisture can penetrate or be accepted.

Hence, when shirred casing sticks exhibiting relatively greater and/or varying shirred densities along their lengths are to be wetted and moisturized, it is desirable to thoroughly wet the deformable members of the various embodiments of the present invention, even to the extent where they are substantially saturated. In wetting and moisturizing those shirred casing sticks which appear to be less dense and/or which exhibit more uniform shirred densities throughout their lengths, the deformable members need not be as wet.

The degree to which the deformable members of the present invention are to be wetted, therefore, can be regulated and controlled depending upon the degree to which the above discussed factors will affect wetting and moisturizing of the shirred casing sticks and the particular characteristics of the shirred casing sticks to be wetted and moisturized.

Once the shirred casing stick 34 has been deposited in the receiving trough 14, it can either be manually removed therefrom and packaged into a caddy, or means can be provided to automatically eject the wetted, shirred casing stick 34 from the receiving trough 14 for subsequent delivery to a packaging station, such as by use of conveyor belts.

In the embodiment of the apparatus depicted in FIG. 3 the same methods and principles are employed for wetting a shirred casing stick 34 as has been described hereinabove for the embodiment of the apparatus illustrated in FIGS. 1 and 2. However, as shown in FIG. 3, the deformable pad member 42 is non-movable. Wetting deformable pad member 42 with water, therefore, is accomplished through conduit 44 connected to a suitable source supply of water and spray nozzle 45 which directs the water onto the upper end of deformable pad member 42. Moisturizing a shirred casing stick 34 in the apparatus depicted in FIG. 3 can then be accomplished in essentially the same manner described hereinabove in connection with the apparatus illustrated in FIGS. 1 and 2 except that only the deformable belt member 26 is caused to be a moving member and must, therefore, be driven toward the receiving trough 14.

Turning now to the embodiment of the apparatus depicted in FIGS. 4 and 5, the apparatus shown therein can first be positioned and aligned adjacent the shirring mandrel of a shirring apparatus so that a shirred casing stick 34 can be delivered to and positioned therein by means of delivery and guide chute 92. Prior to start up, deformable pad member 74 and deformable roll member 70 are wetted with water by means of of water admitted thereto through water supply tubes 80 and 82, respectively, as described hereinabove. While deformable roll member 70 is being wetted with water it is preferred that it be rotated by drive means 86 so that all surfaces of deformable roll member 70 will be exposed and thusly wetted. Once deformable pad member 74 and deformable roll member 70 have been wetted, the apparatus is ready to receive a shirred casing stick 34.

As pointed hereinabove, a shirred casing stick 34 is guided to the apparatus by means of a delivery and guide chute 92 and positioned between deformable roll member 70 and deformable pad member 74 so that at least a portion of its circumferential surface extending along its longitudinal axis is in contact with the deformable roll member 70 and the deformable pad member 74.

As the shirred casing stick 34 contacts the rotating, deformable roll member 70, it is brought into frictional engagement between the circumferential surface of deformable roll member 70 and the arcuate surface of deformable pad member 74 and is thereby caused to rotate therebetween and be thusly conveyed and transported the entire length of deformable pad member 74. As has been previously described, the distance between the surfaces of deformable pad member 74 and deformable roll member 70 can readily be adjusted to accommodate the passage of shirred casing sticks of varying diameter therebetween by adjusting the expandable metal backing 76 and solid metal backing plate 78. As discussed hereinabove, the same factors of duration of contact of the shirred casing stick 34 with the surfaces of deformable roll member 70 and deformable pad member 74, the number of revolutions made by the shirred casing stick 34 as it is transported and conveyed therebetween, and the distance between deformable roll member 70 and deformable pad member 74 can all be regulated and controlled to determine the amount of moisture that the shirred casing stick 34 will be permitted to pick up during its course of travel in the apparatus.

Removal of the wetted, shirred casing stick 34 is accomplished merely by permitting it to continue to travel along the arcuate surface of deformable pad member 74 and roll onto a conveyor belt 90 positioned adjacent the apparatus and thusly be transported away from the apparatus to a packaging station.

Prior to start up of a shirring apparatus, the embodiment of the apparatus of the present invention illustrated in FIG. 6 is preferably positioned adjacent to and in alignment with the end of the shirring mandrel of a shirring apparatus so that, as a shirred casing stick 34 is doffed from the shirring mandrel, it will be deposited between deformable belt members 50. Deformable belt members 50 can be wetted with water by any suitable means including those described hereinabove such as passing a portion of at least one of the deformable belt members 50 through a container filled with water similar to that described in connection with FIGS. 1 and 2, spraying water on the surface of at least one of the moving deformable belt members 50 by means of appropriately positioned spray nozzles such as has been described in connection with FIG. 3, providing water supply tubes adjacent at least one of the deformable belt members 50 similar to that described in connection with FIGS. 4 and 5, and the like. After the deformable belt members 50 have been wetted with water, the shirring apparatus can be started. As a shirred casing stick 34 is doffed from the shirring mandrel of the shirring apparatus, it is delivered to and positioned between the driven deformable belt members 50. The deformable belt members 50, having been previously adjusted to frictionally engage the circumferential surface of the shirred casing stick 34, now transport and convey the entire length of shirred casing stick 34 therethrough so that its circumferential surface becomes wetted and moistened.

As pointed out hereinabove, deformable pad members 54, as shown in FIG. 7, can be utilized in lieu of the deformable belt members 50. The deformable pad members 54 can be positioned adjacent to and aligned with the shirring mandrel of a shirring apparatus in a similar manner to that described hereinabove for the deformable belt members 50. Deformable pad members 54 can also be wetted with water by any means well known to those skilled in the art or by the means described hereinbefore. Preferably, the deformable pad members 54 are fabricated to be at least as long as the longest shirred casing stick to be wetted.

After the shirred casing stick 34 has been doffed from the shirring mandrel and has been delivered to and positioned between the deformable pad members 54, the deformable pad members 54 are energized to contact the circumferential surface of the shirred casing stick 34 in pressing engagement throughout its length thereby wetting and moistening the shirred casing stick 34 at their points of contact with the circumference and along the length of the shirred casing stick.

Although three deformable pad members 54 are shown in this embodiment of the present invention, it is possible to employ only one deformable pad member 54 and utilize the other members as contacting members to force the shirred casing stick 34 into pressing engagement with the single deformable pad member 54. When this is desired, however, it is preferred that at least from between about 15 percent to 20 percent of the circumferential surface of the shirred casing stick extending along its length be wetted and moistened from its pressing engagement with the deformable pad member 54. This will assure that a sufficient portion of the shirred casing stick is wetted and moistened so that it can thereafter be permitted to become completely equilibrated as has been discussed hereinabove.

The apparatus depicted in FIG. 8 can be operated by first placing a shirred casing stick 34 between the opposed planar surfaces of the previously wetted deformable pad members 56, 58 contacting the circumferential surface of the shirred casing stick 34 into pressing engagement therebetween and then horizontally displacing the planar surface of one deformable member 56 over the planar surface of the other deformable pad member 58 thereby rotating the shirred casing stick 34 therebetween. As pointed out hereinabove, this operation can be performed either manually or automatically as desired. Essentially the same factors of time of exposure and the number of revolutions made by the shirred casing stick 34, discussed hereinabove, as well as the degree of pressing engagement to which the shirred casing stick is subjected will also influence the amount of moisture transferred to the shirred casing stick and these factors can be controlled and regulated as desired or required.

The apparatus of the present invention depicted in FIG. 9 is first wetted with water and can thereafter be positioned adjacent the shirring mandrel of a shirring apparatus. The apertures 64, 65 respectively, defined in the deformable pad member 62 and the support member 63 are aligned with the shirring mandrel so that as a shirred casing stick 34 is doffed therefrom it can be passed through and be frictionally engaged by the surface of the aperture 64 defined in the deformable pad member 62. In this manner, shirred casing sticks can be wetted and moisturized at substantially the same rate that tubular lengths of casing are being shirred. Passing a shirred casing stick 34 through the apparatus shown in FIG. 9, however, can also be accomplished either automatically or manually by other means known to those skilled in the art.

It has been found that use of the apparatus illustrated in FIG. 9 is readily adaptable to programming uniform moisture distribution on the circumferential surfaces of shirred casing sticks even though the shirred casing sticks exhibit varying shirred densities along their length. This can be accomplished by controlling the rate at which shirred casing sticks are passed through the apparatus and the extent to which the deformable pad member 62 is wetted so as to permit the same amount of moisture to be transferred to the denser portions as well as to the less dense portions of the shirred casing sticks and thereby obtain a uniform moisture content throughout the length of the shirred casing sticks.

In utilizing the method and apparatus of the present invention, it has been found that the shirred casing sticks can be contacted with the deformable, water absorbable-water releasable members for only a short period of time and a sufficient amount of water can be transferred to the shirred casing sticks during this time to effect an increase in their moisture content from between about 6% to 12%, at which level the tubular casings are shirred, to from between about 14% to 20%, at which level the shirred casing sticks are considered acceptable for stuffing. Surprisingly, this contact period has been found to be generally less than 12 seconds and, in some instances, can be as low as 3 seconds. While the manner in which this relatively rapid transfer of sufficient water to the shirred casing sticks is accomplished is not completely understood, it is believed that this rapid transfer results from a combination of absorption of the water in the wall of the shirred casing stick coupled with a transfer of water to the narrow spaces formed between the closely compacted pleats formed in the casing wall. The transfer of water to the narrow spaces between the pleats is further believed to result from capillary action in the structure of the shirred casing stick in that the narrow spaces between the closely compacted pleats act as reservoirs for small quantities of water transferred thereto and this water is later absorbed throughout the casing stick thereby permitting the casing stick to become equilibrated.

Surprisingly, it has also been found that additives utilized to enhance the ability of the shirred casing sticks to be wetted; that is, wetting agents, generally do not accelerate the rate at which water can be transferred from the deformable, water absorbing-water releasing members to the shirred casing sticks.

As has been discussed hereinabove, it has been further found that the entire circumferential surface of the shirred casing sticks need not be wetted to obtain the desired moisture content level considered acceptable for stuffing. By wetting only a portion of the circumferential surface of shirred casing sticks with an amount of water in excess of that required or desired in the casing sticks based on a unit area of the casing stick, and permitting the thusly wetted casing sticks to equilibrate, shirred casing sticks can be obtained which exhibit a substantially uniform moisture content throughout their length at a level considered acceptable for stuffing.

Although the present invention has been described with particular reference to shirred casing sticks fabricated from cellulose, it should be understood that it is not intended to be nor should it be interpreted as being limited thereto since it can also be utilized with other natural or synthetic hydrophilic materials such as shirred casing sticks fabricated from polyvinyl alcohol, starches, proteins such as collagen, alignates and the like.

While the present invention has been described with particularity and in some detail, it should be understood that changes, modification and alterations can be made therein without departing from the scope and spirit of the invention.

What we claim is:

1. An apparatus for moisturizing shirred casing sticks comprising, in combination:
   (a) at least one deformable member capable of absorbing and retaining water and releasing water upon being deformed, said deformable member comprising at least one vertically disposed endless belt trained about a pair of rolls, one of said rolls being a driven roll, and the planar surface of said vertically disposed belt member being positioned in spaced apart relationship with the planar surface of a vertically disposed and fixedly mounted deformable pad member;
   (b) means for wetting and maintaining said deformable member wetted with water;
   (c) means for maintaining said wetted deformable member in frictional engagement with at least a portion of the circumferential surface of a shirred casing stick extending along its longitudinal axis for the time necessary to wet and moisten the circumferential surface of said shirred casing stick with an amount of water sufficient to obtain a desired moisture content throughout the length of tubular casing; and
   (d) means for removing a moistened and wetted shirred casing stick from the apparatus.

2. A method for moisturizing shirred casing sticks including the steps of:
   (a) contacting at least a portion of the circumferential surface of a shirred casing stick in frictional pressing engagement with the surface of at least one deformable member capable of absorbing and retaining water and releasing water upon being deformed for the time necessary to wet and moisten the circumferential surface of said shirred casing stick with an amount of water sufficient to obtain a desired moisture content throughout the length of a tubular casing in said shirred casing stick;
   (b) maintaining said deformable member wetted with water such that water is transferred to the circumferential surface of said shirred casing stick from said deformable member during its frictional, pressing contact therewith; and,
   (c) removing the thusly moistened and wetted shirred casing stick from its contact with the surface of said deformable member.

3. The method of claim 2 wherein the open end of the shirred casing stick is positioned with an open end thereof out of contact with the surface of said deformable member.

4. The method of claim 2 wherein the shirred casing stick is rotated about its longitudinal axis while in contact with said deformable member.

5. The method of claim 2 wherein the shirred casing stick is passed through an aperture defined in said deformable member and the circumferential surface of said shirred casing stick is frictionally and pressingly engaged by the surfaces of said deformable member defining said aperture during its passage therethrough.

6. The method of claim 2 wherein the shirred casing stick remains in contact with said deformable member for a period of between about 3 to 12 seconds.

References Cited

UNITED STATES PATENTS

| | | | |
|---|---|---|---|
| 3,462,794 | 8/1969 | Martinek | 99—176 X |
| 249,029 | 11/1881 | Du Brul | 118—233 |
| 255,921 | 4/1882 | Bowman | 118—233 |
| 598,628 | 2/1898 | Hess | 118—226 |
| 792,394 | 6/1905 | Buchanan | 118—218 X |
| 1,540,791 | 6/1925 | McDill | 118—257 X |
| 1,622,174 | 3/1927 | Becht | 118—218 X |
| 1,786,437 | 12/1930 | Lemman | 118—257 X |
| 1,847,769 | 3/1932 | Krucken | 118—233 X |
| 2,255,154 | 9/1941 | Esposito | 15—256.6 |
| 2,754,797 | 7/1956 | Krucken | 118—233 X |
| 3,222,192 | 12/1965 | Arnold | 99—176 |

FOREIGN PATENTS

| | | | |
|---|---|---|---|
| 142,305 | 5/1920 | Great Britain | 118—226 |
| 723,378 | 8/1942 | Germany | 118—257 |
| 1,069,233 | 2/1954 | France | 118—258 |

ROBERT HALPER, Primary Examiner

U.S. Cl. X.R.

118—226, 257